UNITED STATES PATENT OFFICE.

CHARLES B. DUDLEY, OF ALTOONA, PENNSYLVANIA.

METHOD OF PURIFYING NATURAL WATERS FOR USE IN STEAM-BOILERS.

SPECIFICATION forming part of Letters Patent No. 267,743, dated November 21, 1882.

Application filed November 3, 1881. (No specimens.)

*To all whom it may concern:*

Be it known that I, CHARLES B. DUDLEY, of Altoona, county of Blair, and State of Pennsylvania, have invented an Improved Method of Purifying Natural Waters for Use in Steam-Boilers; and I do hereby declare that the following is a full and exact description of the same.

This discovery relates to the art of purifying natural waters from the mineral impurities contained therein, which are objectionable when the water is to be used for steam-boilers, or for other purposes where waters free from earthy salts are required; and it consists essentially in a series of steps, fully described hereinafter, by means of which the art may be practiced with success upon a large scale for commercial purposes—a result not before obtained by any known method.

The great loss resulting from the incrustation of boilers by the deposit of mineral impurities from the water used in them is too well known to require consideration here.

The object of this invention is to prevent or reduce this loss, not by the introduction of substances into the boiler itself—a method open to many objections—but by removing the impurities from the water before it is introduced into the boiler, so that, in effect, only a pure water is used, this method being practiced without the use of heat to facilitate the chemical reactions.

The method of carrying my discovery practically into effect is substantially as follows: The water to be purified, having been analyzed to ascertain its chemical composition, and having been placed in a suitable tank, is treated with caustic soda in such quantity as will combine with the carbonic acid contained therein. For example, if the carbonic acid in the water, either as free carbonic acid or combined with carbonates to form bicarbonates, amounts to thirteen (13) grains per gallon, 18.318 grains per gallon of caustic soda will be required. The caustic soda may be added either in solution, or in lumps, or in crystals. The contents of the tank are then agitated until the soda is thoroughly mixed with the water, and then allowed to stand for a time—say twelve hours, more or less—in order that the impurities may be precipitated to the bottom. The clear water may then be drawn off from above the precipitate in any proper manner.

Two important results are obtained by the agitation of the water after the introduction of the soda, as follows: First, the soda is brought into intimate contact with every part of it, so that the chemical reactions are completely carried out; second, the separation of the precipitated mineral matters is so facilitated that the water becomes clear much sooner than it otherwise would. If the soda were simply added to the tank of water, either in lumps, or solution, or in powder, without agitation, the results sought to be obtained would not take place. The soda would go to the bottom of the tank and remain there, and would not free the tank of water from the mineral matter in it, as is accomplished by agitation. Still further, if a solution of soda were diffused through the water without agitation, the precipitates would form, making the water look milky, and this milky condition would continue for a long time; but with agitation the milky condition soon disappears and the precipitates become coagulated into flakes, with clear water between, which flakes soon settle to the bottom.

The chemical action resulting from the introduction of the caustic soda is substantially as follows: The soda, uniting with the carbonic acid in the water, forms carbonate of soda and sets free the carbonates of lime and magnesia and the sulphate of lime held in solution by carbonic acid. The carbonate of soda then unites with the sulphates and chlorides of lime and magnesia, if there be any of the latter present, and forms new compounds with them—*i. e.*, sulphate of soda, carbonate of lime, and carbonate of magnesia, chloride of sodium, carbonate of lime, and carbonate of magnesia. The soda salts remain in the solution; but the carbonates of lime and magnesia are precipitated. Iron and alumina, also in solution in the water, are precipitated; also, other mineral matters held in suspension in many waters will be precipitated by change of condition, giving a perfectly clear purified water.

The result of the whole operation is probably as follows: The lime and magnesia separate as carbonates and the iron and alumina probably as hydrated oxides. The suspended mineral matters are probably largely carried down by contact action. The sulphuric acid and chlorine originally combined with lime, magnesia, iron, or alumina remain in the water, combined with soda.

I am aware that the introduction of soda directly into the boiler has been practiced.

I am aware, also, that the use of a soda solution in the water before the same has been introduced into the boiler has been suggested.

Having thus fully described my discovery, what I claim as new, and desire to secure by Letters Patent, is—

In the art of purifying water, the herein-described method, consisting in the following series of steps: first, introducing the water to be purified into a suitable tank; second, placing in the water a proper quantity of caustic soda; third, thoroughly agitating the contents of the tank; fourth, waiting a sufficient time for the precipitation of the mineral impurities, and, fifth, drawing off the now purified water from above the precipitate.

This specification signed and witnessed this 2d day of November, 1881.

CHAS. B. DUDLEY.

Witnesses:
JNO. W. CLOUD,
MURRAY WILKINS.